US009225067B2

(12) United States Patent
van den Elzen

(10) Patent No.: US 9,225,067 B2
(45) Date of Patent: Dec. 29, 2015

(54) ENHANCED POWER CABLE ARRANGEMENT APPARATUS AND METHOD OF REDUCING A COMMON-MODE INTERFERENCE SIGNAL

(75) Inventor: Jan Johannes Maria van den Elzen, Gemert (NL)

(73) Assignee: TomTom International B.V., Amsterdam (NL)

( * ) Notice: Subject to any disclaimer, the term of this patent is extended or adjusted under 35 U.S.C. 154(b) by 209 days.

(21) Appl. No.: 13/516,238

(22) PCT Filed: Dec. 15, 2009

(86) PCT No.: PCT/EP2009/067144

§ 371 (c)(1),
(2), (4) Date: Jun. 25, 2012

(87) PCT Pub. No.: WO2011/072714

PCT Pub. Date: Jun. 23, 2011

(65) Prior Publication Data

US 2012/0258678 A1 Oct. 11, 2012

(51) Int. Cl.

| | |
|---|---|
| ***H04B 1/18*** | (2006.01) |
| ***H01Q 9/16*** | (2006.01) |
| ***H01Q 1/46*** | (2006.01) |
| ***H01Q 23/00*** | (2006.01) |
| *H04B 1/06* | (2006.01) |
| *H04B 7/00* | (2006.01) |

(52) U.S. Cl.

CPC . *H01Q 9/16* (2013.01); *H01Q 1/46* (2013.01); *H01Q 23/00* (2013.01)

(58) Field of Classification Search

CPC ............ H01Q 1/46; H01Q 23/00; H01Q 9/16
USPC .................... 340/854.9, 855.1; 439/624, 628; 455/63.1, 66.1, 572, 150.1, 270
See application file for complete search history.

(56) References Cited

U.S. PATENT DOCUMENTS

| | | | | |
|---|---|---|---|---|
| 3,649,937 | A * | 3/1972 | Carlson | 334/15 |
| 5,476,394 | A | 12/1995 | Sugihara et al. | |
| 6,909,907 | B1 * | 6/2005 | Oyang et al. | 455/556.1 |
| 2002/0135417 | A1 * | 9/2002 | Lee et al. | 327/553 |
| 2004/0053590 | A1 * | 3/2004 | Marholev | 455/213 |
| 2005/0123147 | A1 * | 6/2005 | Everett et al. | 381/79 |
| 2008/0198276 | A1 * | 8/2008 | Vitito | 348/837 |
| 2009/0121946 | A1 * | 5/2009 | Morse | 343/702 |

FOREIGN PATENT DOCUMENTS

| | | | |
|---|---|---|---|
| EP | 2058625 | A2 | 5/2009 |
| EP | 2077601 | A1 | 7/2009 |
| JP | 10267669 | A | 10/1998 |
| JP | 2005136907 | A | 5/2005 |
| WO | 2009003635 | A1 | 1/2009 |

OTHER PUBLICATIONS

XP001388968—Wilson Robert Morris: "Line cord antenna with coaxial section" R.C.A. Technical Notes, No. 1337, Nov. 1983, Princeton, New Jersey, USA.

* cited by examiner

*Primary Examiner* — Ayodeji Ayotunde

(57) ABSTRACT

An enhanced power cable arrangement apparatus (150) comprises a tuner housing (160), a power adaptor housing (162), and a power cable (164) extending between the tuner housing (160) and the power adaptor housing (162). A reception antenna (166) is provided that extends between the tuner housing (160) and the power adaptor housing (162), the reception antenna (166) comprising a pole portion that extends substantially in parallel with and in spaced relation to the power cable (164). A first end of the reception antenna (166) for coupling to a tuner apparatus (178) is coupled to an amplifier apparatus (194) and a common-mode filter (188).

18 Claims, 6 Drawing Sheets

ENHANCED POWER CABLE ARRANGEMENT APPARATUS AND METHOD OF REDUCING A COMMON-MODE INTERFERENCE SIGNAL

CROSS-REFERENCE TO RELATED APPLICATIONS

Thus application is the National Stage of International Application No. PCT/EP2009/067144, filed Dec. 15, 2009 and designation the United States. The entire content of this application is incorporated herein by reference.

FIELD OF THE INVENTION

The present invention relates to an enhanced power cable arrangement apparatus of the type that, for example, comprises combined parallel coupled cables between a power adapter apparatus and a tuner apparatus in order to provide a reception antenna and a conductive path for electrical power. The present invention also relates to a method of reducing a common-mode interference signal, the method being of the type that, for example, reduces a common-mode interference signal in combined parallel coupled cables between a power adapter apparatus and a tuner apparatus in order to provide a reception antenna and a conductive path for electrical power.

BACKGROUND TO THE INVENTION

Portable computing devices, for example Portable Navigation Devices (PNDs), which include GPS (Global Positioning System) signal reception and processing functionality are well known and are widely employed as in-car or other vehicle navigation systems.

In general terms, a modern PND comprises a processor, memory, and map data stored within said memory. The processor and memory cooperate to provide an execution environment in which a software operating system can be established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include: a visual display and a speaker for audible output. Illustrative examples of input interfaces include: one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device through the display.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of a hardware module and/or software on the device to perform both route calculation and navigation along a calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information can be displayed, optionally in a status bar above, below or to one side of the displayed map information, an example of the navigation information includes a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems, for example a Radio Data System (RDS)-Traffic Message Channel (TMC) service.

Whilst it is known for the device to perform route recalculation in the event that a user deviates from the previously calculated route during navigation (either by accident or intentionally), a further important function provided by the device, and mentioned above, is automatic route re-calculation in the event that real-time traffic conditions dictate that an alternative route would be more expedient. The device is suitably enabled to recognize such conditions automatically, or if a user actively causes the device to perform route recalculation for any reason.

It is also known to allow a route to be calculated with user defined criteria for example, the user may wish to avoid any roads on which traffic congestion is likely, expected or currently prevailing. The device software would then calculate various routes using stored information indicative of prevailing traffic conditions on particular roads, and order the calculated routes in terms of level of likely congestion or delay on account thereof. Other traffic information-based route calculation and navigation criteria are also possible.

It should also be mentioned that, although the route calculation and navigation functions are fundamental to the overall utility of PNDs, it is possible to use the device purely for information display, or "free-driving", in which only map and traffic information relevant to the current device location is displayed, and in which no route has been calculated and no navigation is currently being performed by the device. Such a mode of operation is often applicable when the user already knows the route along which it is desired to travel and does not require navigation assistance. Information concerning traffic is still nevertheless of use for this mode of operation.

In any event, it can be seen that traffic related information is of particular use when calculating routes and directing a user to a location, or simply when free driving. In this respect, and as mentioned above, it is known to broadcast traffic-related information using the RDS-TMC facility supported by some broadcasters. In the UK, for example, one known traffic-related information service is broadcast using the frequencies allocated to the station known as "Classic fm". The skilled person should, of course, appreciate that different frequencies are used by different traffic-related information service providers.

It is also known to provide a PND with an RDS-TMC receiver for receiving RDS data broadcast, decoding the RDS data broadcast and extracting TMC data included in the RDS data broadcast. Such Frequency Modulation (FM) receivers need to be sensitive. For many PNDs currently sold, an accessory is provided comprising an RDS-TMC tuner coupled to an antenna at one end and a connector at another end thereof for coupling the RDS-TMC tuner to an input of the PND.

In order to manufacture the antenna in a manner that is economic and convenient to a user, whilst adhering to national or regional compliance rules, for example those associated with so-called "CE marking", it is known to form the antenna from a straight wire. In this regard, in a vehicle, in order to obviate the need for multiple cables, which typically extend in different directions in an untidy manner, it is known to provide an enhanced power cable that comprises a combination of a power cable and an antenna. Such an enhanced power cable comprises a single pole flexible antenna coupled to the power cable in a spaced relation so that the single pole flexible antenna extends substantially in parallel with the power cable. However, this type of close-coupled straight wire type antenna is susceptible to EMC interference from neighbouring electrical and/or electronic devices, for example the PND and/or a power supply, for example a Cigarette Lighter Adaptor (CLA). In this respect, unlike electronic systems integrated into a vehicle, for example an automobile, the PND is "floating" with respect to ground at Radio Frequencies and so received signals are not referenced to an "EMI clean" body of the vehicle, but to a "noisy" ground reference of the PND instead. Furthermore, it is undesirable, from the perspective of a manufacturer of a PND, to require a user of the PND to connect an antenna to the body of the vehicle in order to obtain the desired "clean" ground reference. The antenna is therefore positioned very close to the EMI "noisy" PND. Consequently, antenna performance can, in some circumstances, be inadequate resulting in the PND not receiving any data or only partial data. From the perspective of a user of the PND, the user simply perceives that no or incomplete traffic information is available and can wrongly conclude that the PND and/or the TMC accessory are/is malfunctioning.

European patent publication no. EP 1 672 787 relates to a broadcast receiver having an antenna socket coupled to a common mode input filter of a radio tuner via a feeder line. However, the input filter requires a ground, which is provided by the radio tuner. An interference-free analogue to the ground is not, unfortunately, available in the context of the RDS-TMC tuner and antenna.

SUMMARY OF THE INVENTION

According to a first aspect of the present invention, there is provided an enhanced power cable arrangement apparatus comprising: a tuner housing and a power adaptor housing; a power cable extending between the tuner housing and the power adaptor housing; and a reception antenna that extends between the tuner housing and the power adaptor housing, the reception antenna comprising a pole portion that extends substantially in parallel with and in spaced relation to the power cable; wherein a first end of the reception antenna for coupling to a tuner apparatus is coupled to an amplifier apparatus and a common-mode filter.

The reception antenna may further comprise another pole portion coupled to the common-mode filter.

The reception antenna may be a resonant feedline dipole reception antenna having a first pole portion constituting the pole portion and a length of coaxial cable constituting a feedline portion and a second pole portion. A length of the first pole portion may correspond to about a quarter of a predetermined wavelength for a Radio-Frequency (RF) signal to be received.

A length of the second pole portion may correspond to between about a third of a predetermined wavelength and about a quarter of the predetermined wavelength for a Radio-Frequency (RF) signal to be received.

The common-mode filter may have a common-mode impedance of between about 1000Ω and about 4000Ω. The common-mode filter may have a common mode impedance of about 2200Ω.

The common-mode filter may be a bifilar coil. The common-mode filter may be disposed within the tuner housing.

The tuner housing may be an encapsulation.

The tuner housing may comprise a tuner apparatus. The tuner apparatus may be a Frequency Modulation (FM) tuner. The tuner apparatus may be a Radio Data System (RDS)-Traffic Message Channel (TMC) tuner.

The apparatus may further comprise a coupling cable extending from the tuner housing for coupling to an electronic device in order to bear data decoded by the tuner apparatus and to support transmission of electrical power for the electronic device.

The first end of the pole portion may be coupled to the amplifier apparatus via the common-mode filter.

The amplifier apparatus may be coupled to the tuner apparatus.

The power cable may have a proximal end with respect to the tuner housing and a distal end with respect to the tuner housing; and the apparatus may further comprise a suppression filter coupled to the power cable at the distal end thereof.

The power adaptor housing may comprise a power supply unit; the power supply unit may comprise: an input terminal for coupling to a connecting interface that is arranged to be coupled to a power outlet; and an output terminal for coupling to the power cable.

The suppression filter may be coupled between the distal end of the power cable and the output terminal of the power supply unit.

The suppression filter may be coupled between the input terminal of the power supply unit and the connecting interface.

According to a second aspect of the present invention, there is provided a portable navigation suite comprising a portable navigation device and the enhanced power cable arrangement apparatus as set forth above in relation to the first aspect of the invention.

According to a third aspect of the present invention, there is provided a method a method of reducing a common-mode interference signal in respect of an enhanced power cable arrangement apparatus, the enhanced power cable arrangement apparatus comprising: a tuner housing and a power adaptor housing; a power cable extending between the tuner housing and the power adaptor housing; and a reception antenna that extends between the tuner housing and the power adaptor housing, the reception antenna comprising a pole portion that extends substantially in parallel with and in spaced relation to the power cable; the method comprising: coupling a first end of the reception antenna for coupling to a tuner apparatus to an amplifier apparatus and a common-mode filter.

It is thus possible to provide an apparatus and method that are less susceptible to common-mode interference signals. Improved signal reception is thus possible, thereby resulting in improved reception of information, for example traffic-related information, such as RDS-TMC data. The structure of the antenna is also simple and economic to manufacture and easier to deploy by a user. The use of the common-mode filter isolates the reception antenna from any common-mode interference signals induced in a coupling cable between a tuner apparatus and a device to which the apparatus can be coupled. Improved isolation of the reception antenna from other common-mode interference signals, for example those resulting from parasitic capacitances of the device to which the reception antenna can be coupled, or from power sources, can be achieved. The suppression filter serves to reduce interference caused by the unclean, i.e. electrically "noisy", power supply of the vehicle. Furthermore, whilst a galvanic connection between the antenna and a chassis of a vehicle provides favourable antenna reception performance, the apparatus and method permit simplicity and convenience of removable installation of an electronic apparatus requiring an antenna, for example in a vehicle, without the need for the galvanic connection. Also, shielding of the tuner apparatus from electromagnetic interference is not mandatory in order to maintain performance of the tuner apparatus. Additionally, the apparatus and method are not necessarily application specific and so provide a flexible solution for different RF reception applications. The improved performance provided by the method and apparatus also reduces instances of user annoyance and false enquires made to manufacturers, distributors and/or retailers concerning whether or not the apparatus is faulty.

Further advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
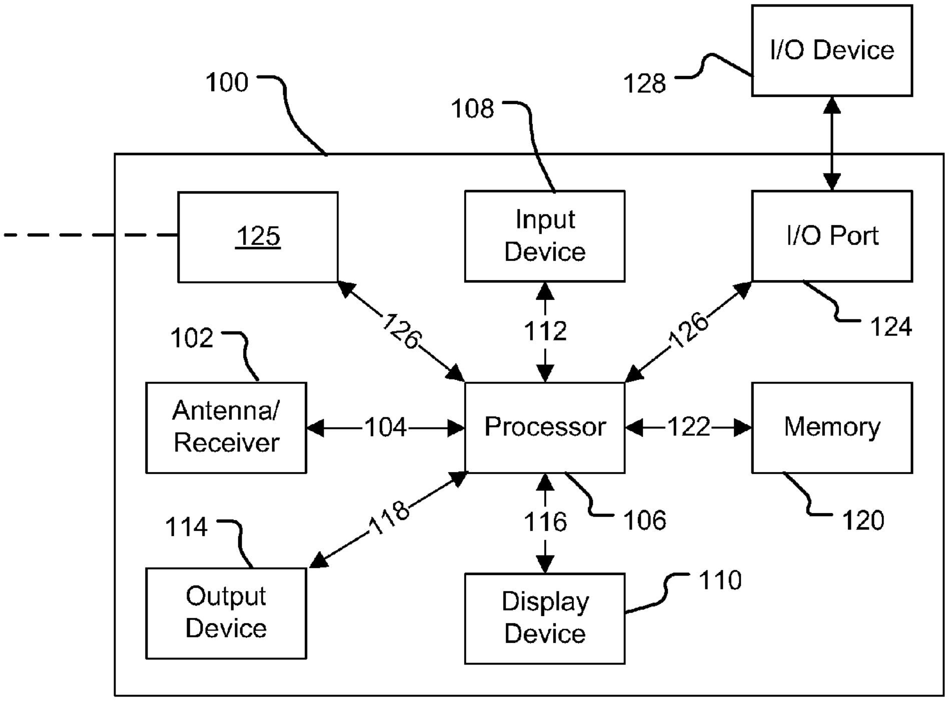
FIG. 1 is a schematic illustration of components of a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device, for example but not limited to those that are configured to execute navigation software in a portable or mobile manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It will also be apparent from the following that the teachings of the present invention even have utility in circumstances where a user is not seeking instructions as to how to navigate from one point to another, but merely wishes to be provided with information concerning, for example, traffic.

Referring to FIG. 1, a navigation device 100 is located within a housing (not shown). The navigation device 100 comprises or is coupled to a GPS receiver device 102 via a connection 104, wherein the GPS receiver device 102 can be, for example, a GPS antenna/receiver. It should be understood that the antenna and receiver designated by reference numeral 102 are combined schematically for illustration, but that the antenna and receiver may be separately located components, and that the antenna may be a GPS patch antenna or helical antenna for example.

The navigation device 100 includes a processing resource comprising, for example, a processor 106, the processor 106 being coupled to an input device 108 and a display device, for example a display screen 110. Although reference is made here to the input device 108 in the singular, the skilled person should appreciate that the input device 108 represents any number of input devices, including a keyboard device, voice input device, touch panel and/or any other known input device utilised to input information. Likewise, the display screen 110 can include any type of display screen for example a Liquid Crystal Display (LCD).

In one arrangement, one aspect of the input device 108, the touch panel, and the display screen 110 are integrated so as to provide an integrated input and display device, including a touchpad or touchscreen input to enable both input of information (via direct input, menu selection, etc.) and display of information through the touch panel screen so that a user need only touch a portion of the display screen 110 to select one of a plurality of display choices or to activate one of a plurality of virtual or "soft" buttons. In this respect, the processor 106 supports a Graphical User Interface (GUI) that operates in conjunction with the touchscreen.

In the navigation device 100, the processor 106 is operatively connected to and capable of receiving input information from input device 108 via a connection 112, and operatively connected to at least one of the display screen 110 and an output device 114, for example an audible output device (e.g. a loudspeaker), via respective output connections 116, 118. As the output device 114 can produce audible information for a user of the navigation device 100, it should equally be understood that the input device 108 can include a microphone and software for receiving input voice commands. Further, the navigation device 100 can also include any additional input device 108 and/or any additional output device, for example audio input/output devices.

The processor 106 is operatively connected to a memory resource 120 via connection 122 and is further arranged to receive/send information from/to input/output (I/O) port 124 via connection 126, wherein the I/O port 124 is connectible to an I/O device 128 external to the navigation device 100. The memory resource 120 comprises, for example, a volatile memory, such as a Random Access Memory (RAM) and a non-volatile memory, for example a digital memory, such as a flash memory.

The external I/O device 128 may include, but is not limited to, an external listening device, such as an earpiece for example. The connection to I/O device 128 can further be a wired or wireless connection to any other external device, for example a car stereo unit for hands-free operation and/or for voice activated operation, for connection to an earpiece or headphones, and/or for connection to a mobile telephone, the mobile telephone connection can be used to establish a data connection between the navigation device 100 and the Internet or any other network for example, and/or to establish a connection to a server via the Internet or some other network for example.

In this regard, the navigation device 100 is capable of establishing a data session, if required, with network hardware of a "mobile" or telecommunications network via a mobile device (not shown), for example the mobile telephone described above, a PDA and/or any device with mobile telephone technology, in order to establish a digital connection, for example a digital connection via known Bluetooth technology.

Thereafter, through its network service provider, the mobile device can establish a network connection (through the Internet for example) with the server (not shown). As such, a "mobile" network connection can be established between the navigation device 100 (which can be, and oftentimes is, mobile as it travels alone and/or in a vehicle) and the server to provide a "real-time" or at least very "up to date" gateway for information.

In this example, the navigation device 100 also comprises an input port 125 operatively coupled to the processor 106 for receipt of traffic-related data.

It will, of course, be understood by one of ordinary skill in the art that the electronic units schematically shown in FIG. 1 are powered by one or more power sources (not shown) in a conventional manner. As will also be understood by one of ordinary skill in the art, that different configurations of the units shown in FIG. 1 are contemplated. For example, the components shown in FIG. 1 may be in communication with one another via wired and/or wireless connections and the like. Thus, the navigation device 100 described herein can be a portable or handheld navigation device 100.

It should also be noted that the block diagram of the navigation device 100 described above is not inclusive of all components of the navigation device 100, but is only representative of many example components.

Figure 2:
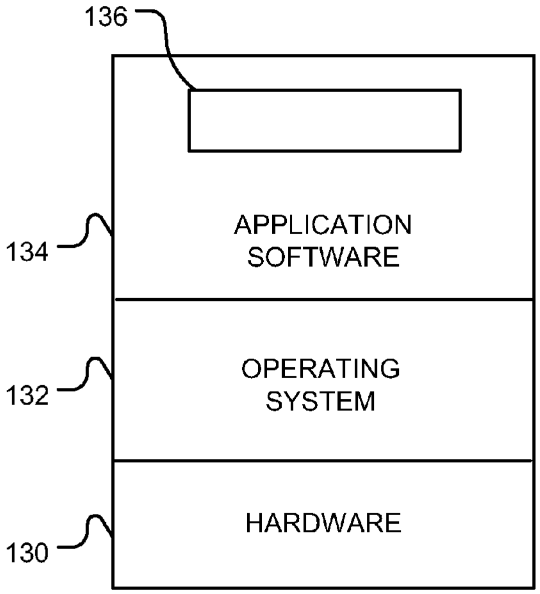
FIG. 2 is a schematic representation of an architectural stack employed by the navigation device of FIG. 1.

Turning to FIG. 2, the memory resource 120 of the navigation apparatus 100 stores a boot loader program (not shown) that is executed by the processor 106 in order to load an operating system 132 from the memory resource 120 for execution by functional hardware components 130, which provides an environment in which application software 134 can run. The operating system 132 serves to control the functional hardware components 130 and resides between the application software 134 and the functional hardware components 130. The application software 134 provides an operational environment including the GUI that supports core functions of the navigation apparatus 100, for example map viewing, route planning, navigation functions and any other functions associated therewith. In this example, part of the application software 134 comprises a traffic data processing module 136 that receives and processes traffic-related data and provides the user with traffic information integrated with map information. As such functionality is not, by itself, core to the embodiments described herein, no further details of the traffic data processing module 136 will be described herein in order not to distract from the description of the embodiments herein.

Figure 3:
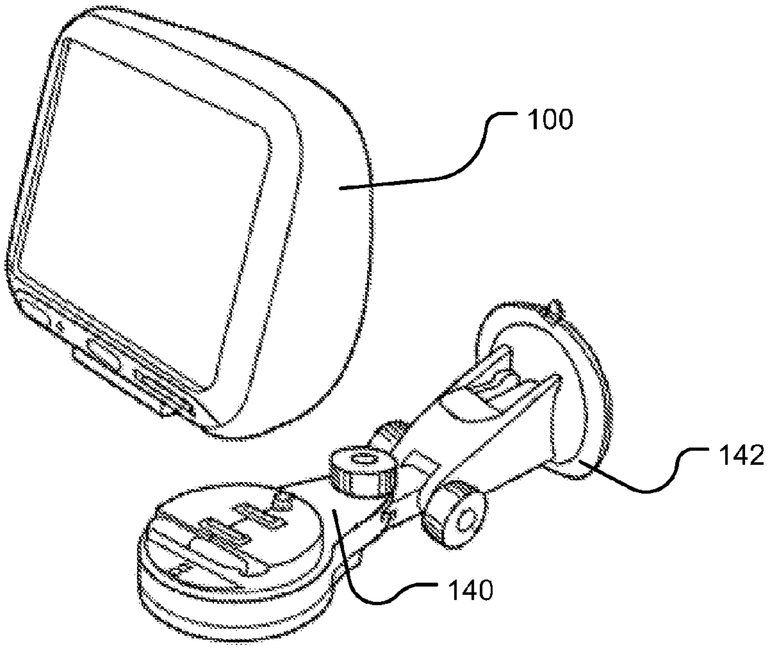
FIG. 3 is a schematic diagram of an arrangement for mounting and/or docking the navigation device of FIG. 1.

Referring to FIG. 3, the navigation device 100 is, in this example, capable of coupling to an arm 140, the arm 140 being capable of being secured to, for example, a vehicle dashboard or window using a suction cup 142. The arm 140 is one example of a docking station with which the navigation device 100 can be docked. The navigation device 100 can be docked with, or otherwise connected to, the docking station 140 by snap connecting the navigation device 100 to the arm 140, for example. The navigation device 100 can also be rotatable on the arm 140. To release a connection between the navigation device 100 and the docking station 140, a button on the navigation device 100 is provided and can be pressed. Other equally suitable arrangements for coupling and decoupling the navigation device 100 to a docking station can alternatively be provided.

Figure 4:
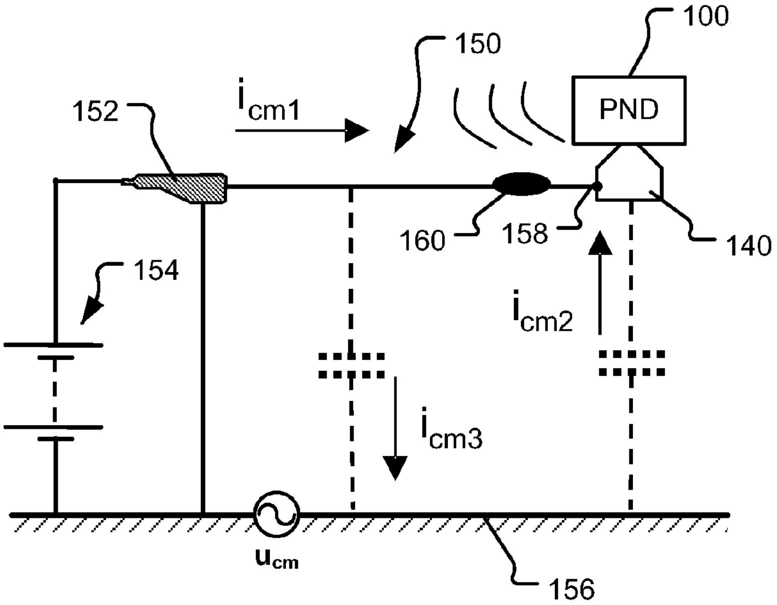
FIG. 4 is a schematic diagram of an enhanced power cable arrangement apparatus coupled to the navigation device of FIG. 1.

Turning to FIG. 4, the navigation device 100 is, in this example, located in a vehicle, for example an automobile, and connected to the docking station 140. The docking station 140 is coupled to an enhanced power cable arrangement apparatus 150 comprising a Cigarette Lighter Adaptor (CLA) 152 at one end thereof, the CLA 152 being plugged into a so-called cigarette lighter (not shown) of the vehicle. The coupling of the CLA 152 to the cigarette lighter of the vehicle allows a battery 154 of the vehicle to be used to power the navigation device 100, in this example via the docking station 140, after appropriate conversion of the 12V Direct Current (DC) supply provided by the battery 154. Both the battery 154 and the CLA 152 are coupled to the ground 156 provided by the vehicle, typically the chassis or body of the vehicle.

The docking station 140 comprises an input port 158 that is coupled to the input port 125 of the navigation device 100 when the navigation device 100 is docked. The enhanced power cable arrangement apparatus 150 is coupled, at another end thereof opposite to the end comprising to the CLA 152, to the input port 158 of the docking station 140. Of course, if the docking station 140 is not employed, the enhanced power cable arrangement apparatus 150 can be directly connected to the input port 125 of the navigation device 100.

Figure 5:
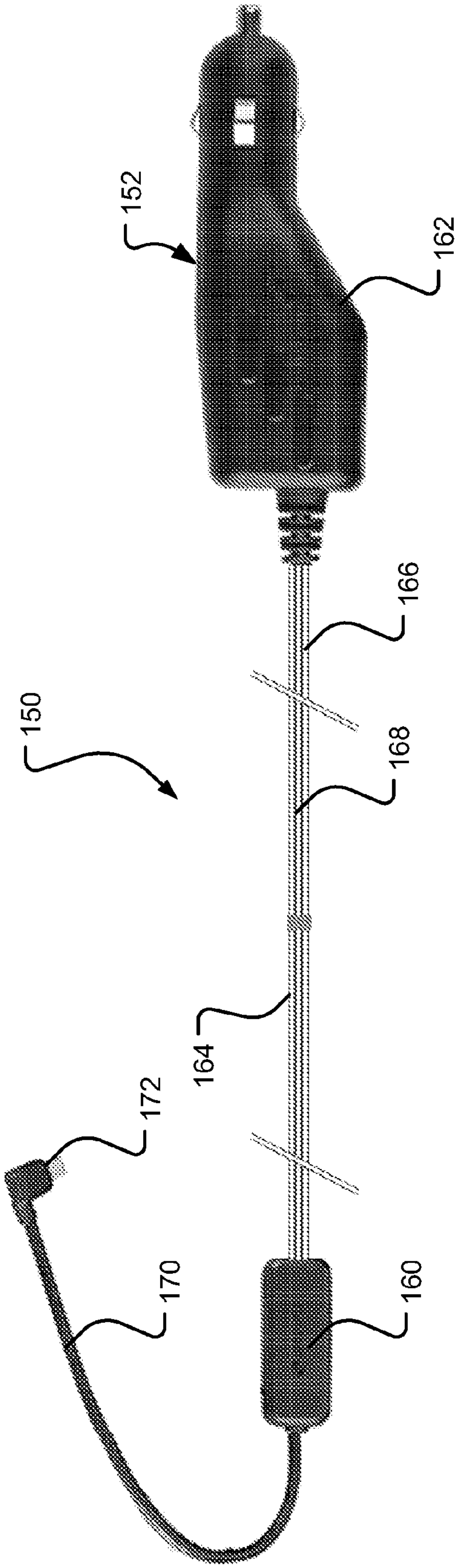
FIG. 5 is a schematic diagram of the enhanced power cable arrangement apparatus of FIG. 4 in greater detail and constituting an embodiment of the invention.

Referring additionally to FIG. 5, the enhanced power cable arrangement apparatus 150 comprises a tuner housing 160 and a power adaptor housing 162 of the CLA 152. A power cable 164 extends between the tuner housing 160 and the power adaptor housing 162. In this example, the tuner housing 160 is an encapsulation. The enhanced power cable arrangement apparatus 150 also comprises a reception antenna 166 that extends between the tuner housing 160 and the power adaptor housing 162. The reception antenna 166 extends substantially in parallel with and in spaced relation to the power cable 164. In this regard, the spaced relation is maintained between the power cable 164 and the reception antenna 166 by a so-called “loose tube” 168. The enhanced power cable arrangement apparatus 150 further comprises, in this example, a coupling cable 170 coupled at one end thereof to the tuner housing 160 and having a coupling connector 172, for example a so-called mini-USB (Universal Serial Bus) connector, at another end thereof for coupling to the input port 158 or the input port 125 mentioned above. The coupling cable 170 carries USB lines and power lines (not shown) and extends from the tuner housing 160 for coupling the enhanced power cable arrangement apparatus 150 to an electronic device, for example the navigation device 100 in order to bear data encoded by a tuner apparatus (not shown in FIG. 5) and to support transmission to electrical power for the electronic device.

Figure 6:
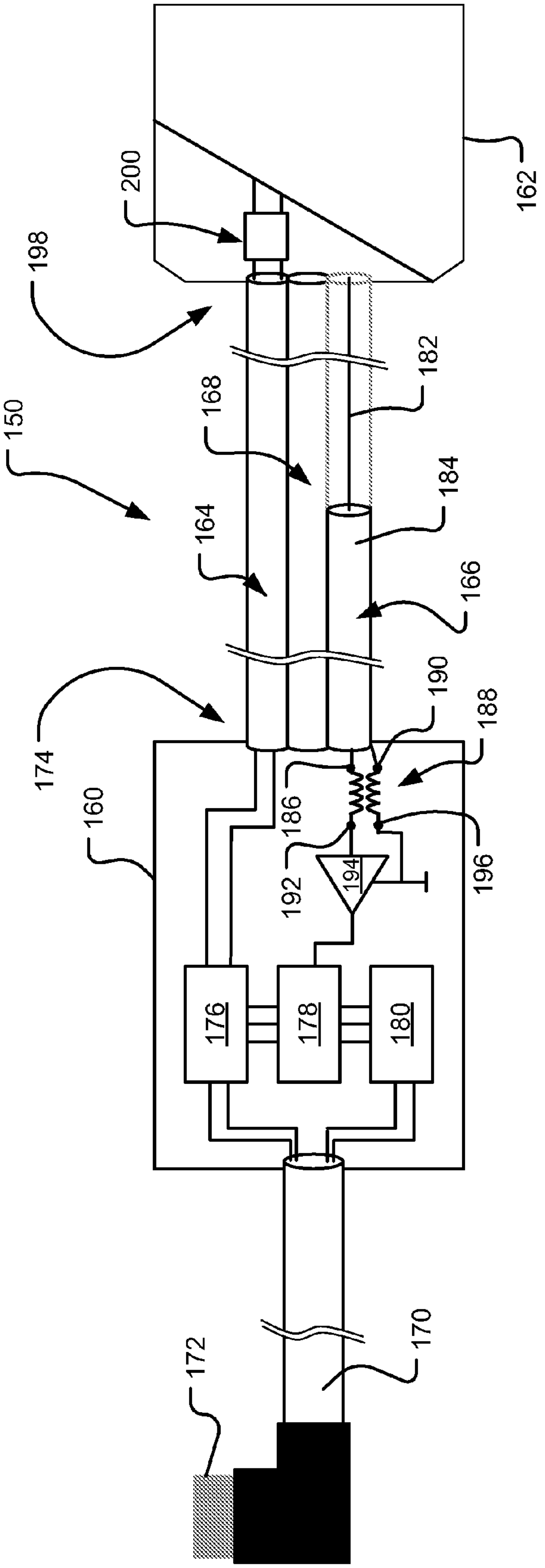
FIG. 6 is a schematic diagram of the enhanced power cable arrangement apparatus of FIG. 4 in further detail.

Turning to FIG. 6, as mentioned above, the power cable 164 and the reception antenna 166 extend substantially in parallel between the tuner housing 160 and the power adaptor housing 162 by virtue of the loose tube 168, the loose tube 168 also maintaining a substantially constant spacing between the power cable 164 and the reception antenna 166. Additionally, each of the tuner housing 160 and the power adaptor housing 162 comprises a pull-relief arrangement (not shown) to prevent pulling of the power cable 164 and the reception antenna 166 that can cause the power cable 164 and/or the reception antenna 166 to become detached from one or both of the tuner housing 160 and the power adaptor housing 162 and/or any electrical connections being broken.

A first, proximal, end 174 of the power cable 164 is electrically coupled to a power module 176 disposed within the tuner housing 160, the power module 176 being coupled to the coupling cable 170. In this example, the USB lines carried by the coupling cable 170 constitute a source of RF interference with respect to the power lines carried by the coupling cable 170, and so through use of appropriate filtering the power module 176 serves to provide a “clean”, substantially interference free, 5V power supply in spite of the presence of the USB lines. The power module 176 is also coupled to a tuner apparatus 178 also disposed within the tuner housing 160. The tuner apparatus 178 is coupled to a USB interface module 180, but also to the reception antenna 166 at a first end thereof 174 in the following manner. The USB interface module 180 is coupled to the coupling cable 170.

The tuner apparatus 178 within the tuner housing 160 is, in this example, a Frequency Modulation (FM) tuner, particularly an RDS-TMC tuner. By way of example, a suitable tuner is an SI4703 Integrated Circuit (IC) available from Silicon Laboratories, Inc. USA.

The reception antenna 166 is, in this example, a resonant feedline antenna, which is a type of dipole antenna. Consequently, the reception antenna 166 comprises a first pole portion 182 coupled to a length of coaxial cable 184 having a core (not shown) and a shield, the length of coaxial cable 184 serves as a feedline portion of the dipole reception antenna 166, but the shield also serves as a second pole portion. The first pole portion 182 is formed from a length of conductor, for example a uniaxial conductor. In this example, the core (not shown) of the second length of coaxial cable 184 is used as the uniaxial electrical conductor forming the first pole portion 182. However, the skilled person should appreciate that a separate, unshielded, conductor can be used and coupled to the core of the length of coaxial cable 184, for example by soldering. As can be seen from FIG. 6, the resonant feed-line dipole reception antenna 166 is end-fed.

A first length of the first pole 182 corresponds to a quarter of a wavelength ($\lambda/4$) of a signal the receipt of which is desired, for example a broadcast signal, such as an FM signal comprising RDS-TMC data. Consequently, in this example, the length of the first pole 182 is about 75 cm. Similarly, a second length of the second pole 184 corresponds to a quarter of a wavelength ($\lambda/4$) of the signal the receipt of which is desired. Consequently, in this example, the resonant feedline reception antenna 166 is symmetric, the length of the second pole 184 also being about 75 cm.

In another embodiment, the resonant feedline reception antenna 166 is asymmetric, the first length of the first pole portion 182 and the second length of the second pole portion 184 being different proportions of the wavelength (λ). Consequently, the first length of the first pole portion 182 can also correspond to a quarter of the wavelength (λ/4) of the signal the receipt of which is desired, for example the broadcast signal, such as the FM signal comprising RDS-TMC data. For example, the length of the first pole portion 182 can again be about 75 cm. However, the second length of the second pole portion 184 can correspond to a third of a wavelength (λ/3) of the signal the receipt of which is desired. For example, the length of the second pole portion 184 can be about 50 cm. Hence, it can be seen that the length of the second pole 184 can correspond to between about one third of the wavelength and about one quarter of the wavelength.

The core of the length of coaxial cable 184 is coupled at the first end 174 to a first terminal 186 of a filter 188, the shield of the coaxial cable 166 being coupled at the first end 174 to a second terminal 190 of the filter 188. A third terminal 192 of the filter 188 is coupled to an input of an amplifier apparatus 194, a ground terminal of the amplifier apparatus 194 and a fourth terminal 196 of the filter 188 being coupled to ground potential. An output terminal of the amplifier apparatus 194 is coupled to an input of the tuner apparatus 178.

In this example, the filter 188 is a common-mode filter, for example a common-mode transformer, such as a coil, or a toroidal inductor or a common-mode choke, for example a bifilar choke. As mentioned above, the filter 188 is located in the tuner housing 160 and has a common-mode impedance and a differential-mode impedance. The common-mode impedance of the filter 188 can be at least about 1 kΩ. The common-mode impedance can be between about 1 kΩ and about 4 kΩ, for example between about 1.5 kΩ and about 2.5 kΩ, such as between about 2 kΩ and about 2.3 kΩ. In this example, the filter 188 has a common-mode impedance of about 2.2 kΩ. This is considerably in excess of an inherent common-mode impedance of a length of cable. The differential-mode impedance of the filter 188 can be between about 1Ω and about 50Ω, for example, between about 1Ω and about 20Ω, such as between about 5Ω and about 15Ω. In this example, the differential-mode impedance of the filter 188 is about 10Ω.

The power module 176 is coupled to the coupling cable 170. Similarly, the USB interface module 180 is also coupled to the coupling cable 170.

Figure 7:
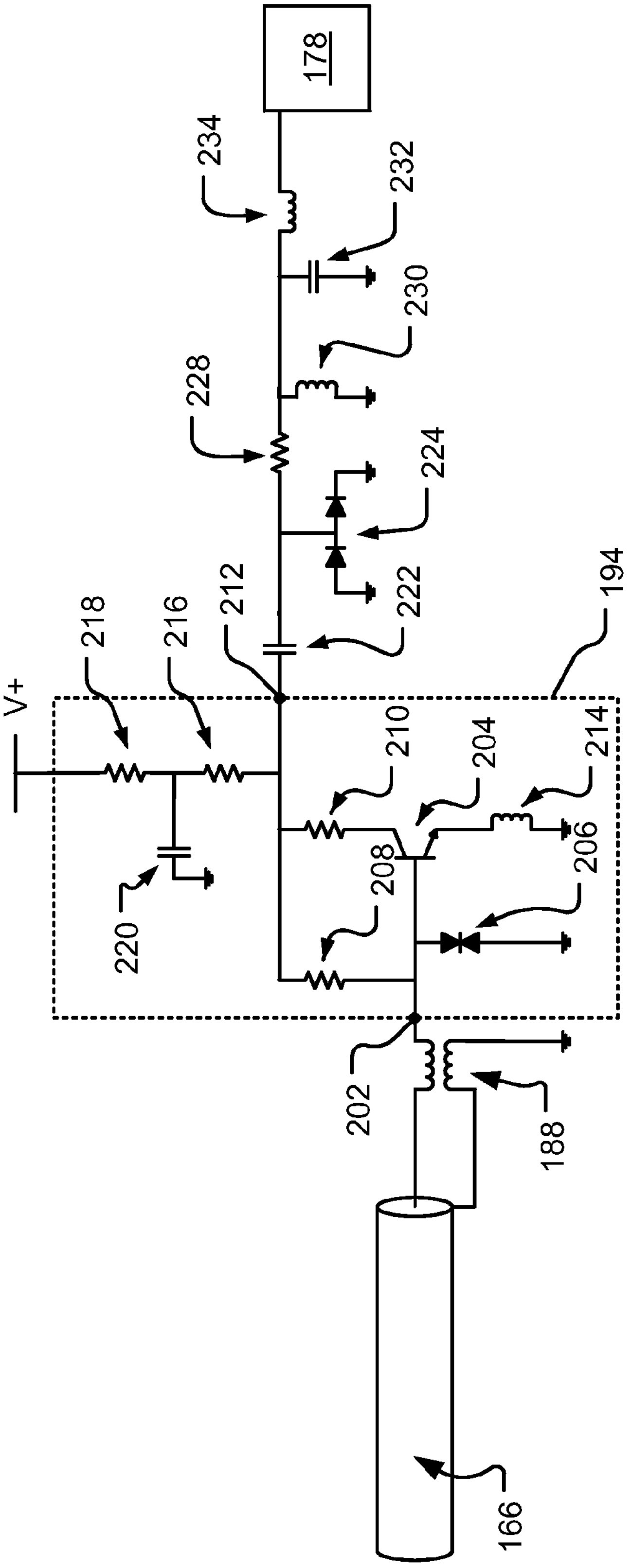
FIG. 7 is a schematic diagram of an electronic circuit used to couple a reception antenna of FIG. 6 to a tuner apparatus.

Turning to FIG. 7, the amplifier apparatus 194 is a low noise amplifier circuit comprising an input terminal 202 that is coupled, in this example, to the third terminal 192 of the filter 188. The input terminal 202 is coupled to a base terminal of a bipolar Radio Frequency (RF) transistor 204, such as an NPN bipolar transistor, and to ground potential via a voltage clamp 206 comprising a pair of back-to-back coupled diodes for Electrostatic Discharger Protection (ESD) purposes. The input terminal 202 is also coupled to a first terminal of a first resistor 208, for example an 18 kΩ resistor. A collector terminal of the bipolar transistor 204 is coupled to a first terminal of a second resistor 210, for example a 22Ω resistor, a second terminal of the second transistor 210 being coupled to a second terminal of the first resistor 208 and an output terminal 212 of the amplifier apparatus 194. An emitter terminal of the bipolar transistor 204 is also coupled to ground potential via a first inductor 214, for example a 10 nH inductor.

The output terminal 212 of the amplifier apparatus 194 is coupled to a first terminal of a third resistor 216, for example a 56Ω resistor. A second terminal of the third resistor 216 is coupled to a supply voltage via a fourth resistor 218, for example a 100Ω resistor. The second terminal of the third resistor 216 is also coupled to ground potential via a first capacitor 220, for example a 5.6 nF capacitor.

External to the amplifier apparatus 194, the output terminal 212 of the amplifier apparatus 194 is coupled to a first terminal of a second capacitor 222, for example a 100 pF capacitor. A second terminal of the second capacitor 222 is coupled to another voltage clamp 224 comprising a pair of head-to-toe (or anode to cathode) coupled diodes for attenuating RF signal levels that are too high and so incompatible with the tuner apparatus 178, the second terminal of the second capacitor 222 being coupled between the pair of coupled diodes. The second terminal of the second capacitor 222 is also coupled to a first terminal of a fifth resistor 228, for example a 2.2Ω resistor. A second terminal of the fifth resistor 228 is coupled to ground potential via a second inductor 230, for example a 270 nH inductor, and separately via a third capacitor 232, for example a 3.3 pF capacitor. The second terminal of the fifth resistor 228 is also coupled to a first terminal of a third inductor 234, for example a 9.1 nH inductor, a second terminal of the third inductor 234 being coupled to the tuner apparatus 178. The second and third capacitors 222, 232, the fifth resistor 228 and the second and third inductors 230, 234, serve to block DC signals, impedance match and filter harmonics originating from a local oscillator of the tuner apparatus 178.

Referring back to FIG. 6, at a second, distal, end 198 of the power cable 164 and the reception antenna 166, the power cable 164 and the reception antenna 166 are, in this example, coupled to the power adaptor housing 162. In this example, the second end of the power cable 164 is coupled to a suppression filter 200 disposed in the power adaptor housing 162. The suppression filter 200 can be disposed between the second end of the power cable 164 and a power supply to be described hereinbelow, or between the power supply and a connecting interface for coupling the CLA 152 to a power outlet.

Figure 8:
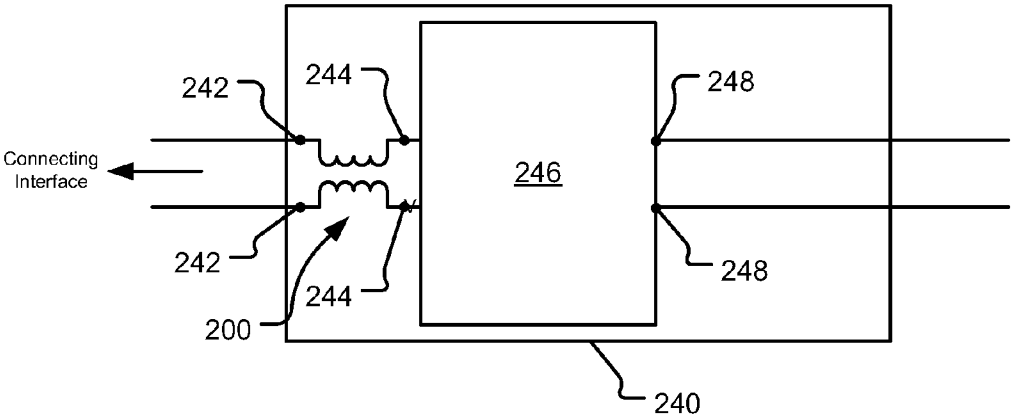
FIG. 8 is a schematic diagram of a power adaptor apparatus of the enhanced power cable arrangement apparatus of FIG. 6 in one embodiment of the invention.

Turning to FIG. 8, in one embodiment, the power adaptor housing 162 comprises a power adaptor apparatus 240 comprising a connecting interface (not shown) arranged to be coupled, when in use, with a power outlet, for example the cigarette lighter of the vehicle mentioned above. The terminals of the connecting interface are coupled to first and second terminals 242 of the suppression filter 200, which in this embodiment is a common-mode coil. The common-mode coil has, in this example, an impedance greater than about 1 kΩ at 100 MHz, such as a 3 kΩ impedance at 100 MHz, and a Direct Current (DC) resistance less than about 200 mΩ, such as a DC resistance of 200 mΩ. Output terminals 244 of the common mode coil 200 are coupled to input terminals of a switched-mode power supply 246, for example a so-called Buck converter circuit. Output terminals 248 of the switched-mode power supply 246 are coupled to separate wires of the power cable 164.

In another embodiment (FIG. 9), the common mode coil 200 of FIG. 8 is not employed. Instead, the connecting interface is coupled to the switched-mode power supply 246 without a suppression filter 200 in-between, the suppression filter 200 being coupled between the distal end of the power cable 164 and the output terminals of the switched-mode power supply 246. In this example, the suppression filter 200 is a filter having the following structure. A first output terminal 250 of the switched-mode power supply 246 is therefore coupled to a first terminal of a first ferrite chip inductor 252, a second terminal of the first ferrite chip inductor 252 being coupled to a first terminal of a fourth capacitor 254. A second output terminal 256 of the switched mode power supply 246 is coupled to a first terminal of a second ferrite chip inductor 258, a second terminal of the second ferrite chip inductor 258 being coupled to a second terminal of the fourth capacitor 254. Separate wires of the power cable 164 are respectively coupled to the first and second terminals of the fourth capacitor 254 so as to be coupled across the fourth capacitor 254. The ferrite chip inductors 252, 258 provide an impedance of more than 300Ω in the FM frequency band of the electromagnetic spectrum, for example between about 300Ω and about 1000Ω in the FM frequency band of the electromagnetic spectrum.

Figure 9:
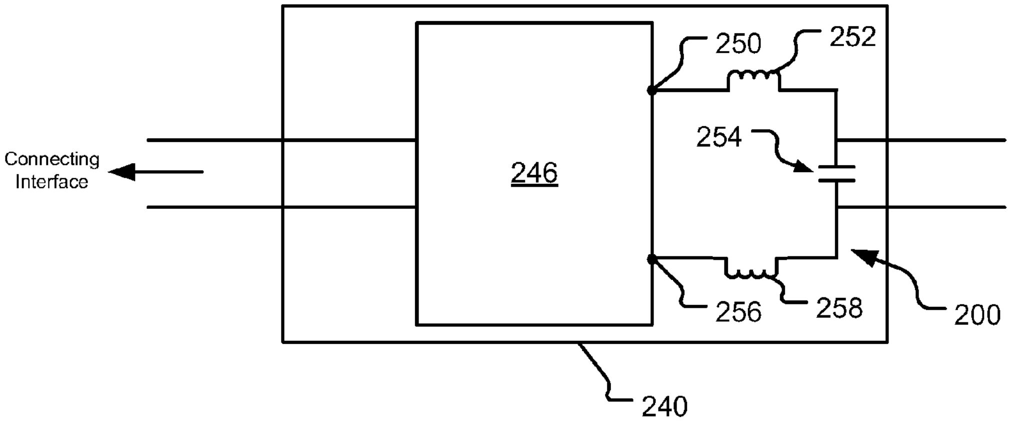
FIG. 9 is a schematic diagram of the power adaptor apparatus of the enhanced power cable arrangement apparatus of FIG. 6 in another embodiment of the invention.

In a further embodiment, the common-mode coil of FIG. 8 and the filter of FIG. 9 are used in combination in order to provide improved filtering.

Referring back to FIG. 4, in operation, a common mode voltage $u_{cm}$, is present in the system as a result of other interference-generating sources in the vehicle, for example a switched-mode power supply associated with provision of power by the vehicle.

Of particular note, the system comprises a first common-mode interference current component, $i_{cm1}$, which flows in the power cable 164 from the CLA 152 to the docking station 140 and hence the navigation device 100. A dominant component of the first common-mode interference current component, $i_{cm1}$, is generated by the CLA 152, but the first common-mode interference current component, $i_{cm1}$, also comprises a component attributable to the common mode voltage $u_{cm}$. A second common-mode interference current component, $i_{cm2}$, flows into the reception antenna 166, a dominant component thereof resulting from a parasitic capacitance existing between the ground 156 and the navigation device 100 and electromagnetic radiation emitted by the power cable 164. However, another component of the second common-mode interference current component, $i_{cm2}$, is attributable to the first common-mode interference current component, $i_{cm3}$, and a third common-mode interference current component, $i_{cm3}$, to be described below. Of course, the second common-mode interference current component, $i_{cm2}$, flows into the reception antenna 166 irrespective of whether or not the CLA 152 is coupled to the cigarette lighter of the vehicle and/or is present, although it should be appreciated that in such circumstances the second common-mode interference current component, $i_{cm2}$, will not comprise the component associated with the first common-mode interference current component, $i_{cm1}$.

Additionally, the third common-mode interference current component, $i_{cm3}$, is induced in the reception antenna 166 by electromagnetic radiation emanating from the navigation device 100 and represents a dominant component thereof. However, the third common-mode interference current component, $i_{cm3}$, also comprises a component attributable to the common-mode interference current component, $i_{cm1}$, and the second common-mode interference current component, $i_{cm2}$.

The presence of the filter 188 serves to isolate the resonant feed-line reception antenna 166 from the above common-mode interference current components and so performance of the reception antenna 166 is improved significantly, for example by about 20 dB. As will be explained later herein, the suppression filter 200 also serves to reduce differential-mode and common-mode interference caused in relation to supply of power by more than 15 dB, thereby reducing interference being electromagnetically induced into the substantially parallel reception antenna 166.

Without the filter 188, the coupling cable 170 is a so-called "hot circuit" or is "EMC hot" and exhibits antenna-like behaviour. By provision of the filter 188, the distance at which conductors carry common-mode interference currents induced by electromagnetic radiation emissions, for example from the navigation device 100, is increased, namely the conductors of the reception antenna 166 are the only conductors into which common-mode interference currents can be induced by electromagnetic radiation emitted by the navigation device 100. Due to the distance of the reception antenna 166 from the source of the electromagnetic radiation, namely the navigation device 100, and the attenuation of the power of the electromagnetic radiation with distance from the navigation device 100, the amount of induced common-mode interference current that flows in the reception antenna 166 is minimised considerably.

The suppression filter 200 as employed in FIG. 8 serves to provide filtering in respect of the common mode voltage $u_{cm}$. The suppression filter 200 of FIG. 9 also provides some filtering in respect of the common mode voltage $u_{cm}$, but also in respect of interference generated by the switched-mode power supply 246. Hence, it can be seen that in the embodiment employing the filtering of FIGS. 8 and 9 in combination, the filtering benefits of both filters can be obtained to filter, more comprehensively, the common mode voltage $u_{cm}$, and the interference attributable to the switched-mode power supply 246.

A differential-mode current signal generated in the reception antenna 166 is therefore received, with reduced common-mode interference current components, by the receiver tuner apparatus 178 via the amplifier apparatus 194 and demodulated and decoded before communication to the navigation device 100, via the USB interface module 180 and the input port 125. The USB interface module 180 converts input signals into a format compatible with the USB specification for signal communication between devices. The data carried by the signals output by the USB interface module 180 are used by the traffic data processing module 136 of the application software 134. The differential-mode current is almost unaffected by the presence of the common-mode filter 188. Electrical power received by the power module 176 is transmitted to power pins of the mini-USB connector 172 for use by the navigation device 100.

The skilled person should understand that the enhanced power cable arrangement apparatus can be provided alone as an accessory, or as a product suite, for example in combination with the navigation device 100.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments have been described in the context of the resonant feedline dipole reception antenna 166, it should be appreciated that any suitable reception antenna can be employed and that other embodiments, employing other types of antenna are envisaged. For example, in another embodiment, the feedline portion 196 need not be employed and a single pole antenna, for example using a uniaxial wire, can be coupled to the filter 188 without the need for disposal of the feedline portion therebetween.

Although the above embodiments have been described in relation to reception of FM signals, particularly RDS-TMC signals, the skilled person should appreciate that the above embodiments can be used in respect of other applications, for example Digital Audio Broadcast (DAB) reception, such as Transport Protocol Experts Group (TPEG) data streams. Indeed, the skilled person should appreciate that the reception antenna 166 can be used to receive signals bearing audio information, for example FM audio signals. Consequently, the antenna arrangement apparatus can be used in connection with FM radio applications, for example FM radio applications used in relation to other electronic devices, such as communications devices. One suitable example is a mobile telephone handset comprising an integrated FM receiver or coupled to an FM receiver module.

By way of further example, it should be appreciated that although the above embodiments have been described in the context of a navigation apparatus, the techniques described herein are not only applicable to navigation apparatus, but also to any other electronic apparatus or accessories therefor capable of receiving RF signals, for example RDS or RDBS data signals on an FM channel. Examples of suitable devices include mobile telephones or media players, such as music players, in particular but not exclusively MP3 players or accessories therefor.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. An enhanced power cable arrangement apparatus comprising:

a tuner housing and a power adaptor housing, the tuner housing comprising a tuner apparatus, an amplifier apparatus and a common-mode filter;

a power cable extending between the tuner housing and the power adaptor housing; and a reception antenna that extends between the tuner housing and the power adaptor housing, the reception antenna comprising a pole portion that extends substantially in parallel with and in spaced relation to the power cable;

wherein a first end of the reception antenna for coupling to the tuner apparatus is coupled to the amplifier apparatus and the common-mode filter.

2. An apparatus as claimed in claim 1, wherein the reception antenna further comprises another pole portion coupled to the common-mode filter.

3. An apparatus as claimed in claim 1, wherein the reception antenna is a resonant feedline dipole reception antenna having a first pole portion constituting the pole portion and a length of coaxial cable constituting a feedline portion and a second pole portion.

4. An apparatus as claimed in claim 3, wherein a length of the first pole portion corresponds to about a quarter of a predetermined wavelength for a Radio-Frequency (RF) signal to be received.

5. An apparatus as claimed in claim 4, wherein a length of the second pole portion corresponds to between about a third of a predetermined wavelength and about a quarter of the predetermined wavelength for a Radio-Frequency (RF) signal to be received.

6. An apparatus as claimed in claim 1, wherein the common-mode filter has a common-mode impedance of between about 1000 Ω and about 4000 Ω.

7. An apparatus as claimed in claim 6, wherein the common-mode filter has a common mode impedance of about 2200 Ω.

8. An apparatus as claimed in claim 1, wherein the common-mode filter is a bifilar coil.

9. An apparatus as claimed in claim 1, wherein the tuner apparatus is one of: a Frequency Modulation (FM) tuner; and a Radio Data System (RDS)-Traffic Message Channel (TMC) tuner.

10. An apparatus as claimed in claim 1, further comprising a coupling cable extending from the tuner housing for coupling to an electronic device in order to bear data decoded by the tuner apparatus and to support transmission of electrical power for the electronic device.

11. An apparatus as claimed in claim 1, wherein the first end of the pole portion is coupled to the amplifier apparatus via the common-mode filter.

12. An apparatus as claimed in claim 11, wherein the tuner housing comprises a tuner apparatus, and wherein the amplifier apparatus is coupled to the tuner apparatus.

13. An apparatus as claimed in claim 1, wherein the power cable has a proximal end with respect to the tuner housing and a distal end with respect to the tuner housing; and the apparatus further comprises a suppression filter coupled to the power cable at the distal end thereof.

14. An apparatus as claimed in claim 1, wherein the power adaptor housing comprises a power supply unit, the power supply unit comprising:

an input terminal for coupling to a connecting interface that is arranged to be coupled to a power outlet; and an output terminal for coupling to the power cable.

15. An apparatus as claimed in claim 14, wherein the power cable has a proximal end with respect to the tuner housing and a distal end with respect to the tuner housing; and the apparatus further comprises a suppression filter coupled to the power cable at the distal end thereof, wherein the suppression filter is coupled between the distal end of the power cable and the output terminal of the power supply unit.

16. An apparatus as claimed in claim 14, wherein the power cable has a proximal end with respect to the tuner housing and a distal end with respect to the tuner housing; and the apparatus further comprises a suppression filter coupled to the power cable at the distal end thereof, wherein the suppression filter is coupled between the input terminal of the power supply unit and the connecting interface.

17. A portable navigation suite comprising a portable navigation apparatus and the enhanced power cable arrangement apparatus as claimed in claim 1.

18. An apparatus as claimed in claim 1, wherein the tuner housing further comprises a universal serial bus interface.

* * * * *